United States Patent [19]
Bossard

[11] Patent Number: 4,747,160
[45] Date of Patent: May 24, 1988

[54] LOW POWER MULTI-FUNCTION CELLULAR TELEVISION SYSTEM

[75] Inventor: Bernard Bossard, Medfield, Mass.

[73] Assignee: Suite 12 Group, Freehold, N.J.

[21] Appl. No.: 25,720

[22] Filed: Mar. 13, 1987

[51] Int. Cl.⁴ .............................................. H04B 1/10
[52] U.S. Cl. ........................................ 455/33; 379/59
[58] Field of Search ......................... 455/33, 3, 60, 52; 379/58, 59, 60; 342/361; 358/171

[56] References Cited

U.S. PATENT DOCUMENTS

| | | |
|---|---|---|
| 2,288,802 | 7/1942 | Hammond, Jr. . |
| 2,992,427 | 7/1961 | Franco . |
| 3,041,450 | 6/1962 | Parker . |
| 3,864,633 | 2/1975 | Strenglein . |
| 3,882,393 | 5/1975 | Epstein . |
| 4,128,740 | 12/1978 | Graziano ............................. 455/33 |
| 4,220,923 | 9/1980 | Pelchat et al. . |
| 4,228,540 | 10/1980 | Ogita . |
| 4,313,220 | 1/1982 | Lo et al. . |
| 4,317,130 | 2/1982 | Brown ................................. 358/108 |
| 4,321,705 | 3/1982 | Namiki . |
| 4,369,520 | 1/1983 | Cerny, Jr. et al. .................. 455/137 |
| 4,495,648 | 1/1985 | Giger . |
| 4,513,412 | 4/1985 | Cox ...................................... 370/29 |
| 4,521,878 | 6/1985 | Toyonaga . |
| 4,525,861 | 6/1985 | Freeburg . |
| 4,528,656 | 7/1985 | Morais . |
| 4,578,815 | 3/1986 | Persinotti ............................. 455/15 |
| 4,633,463 | 12/1986 | Mack .................................... 370/95 |
| 4,660,045 | 4/1987 | Clark ................................... 342/361 |
| 4,704,733 | 11/1987 | Kawano ............................... 455/16 |

Primary Examiner—Robert Lev
Attorney, Agent, or Firm—Richard C. Woodbridge

[57] ABSTRACT

A multi-function cellular television system includes transmitting antennas located in an array such that the transmitted signals of adjacent antennas are of substantially differing polarity. The system provides for a variety of two-way communication services including television, both public and private programming, digital two-way transmission, special video teleconferencing, radio programming and telephone services. A low power output coupled with a wide bandwidth in the 27.5 to 29.5 GHZ millimeter wave band region is employed along with very high Q filtering intermodulation and interference reduction circuitry. The system has the ability to transmit, retransmit and receive numerous simultaneous signals with little or no modulation distortion or interaction. Further reduction of distortion is achieved through the use of modulation diversity, frequency diversity and space diversity.

20 Claims, 10 Drawing Sheets

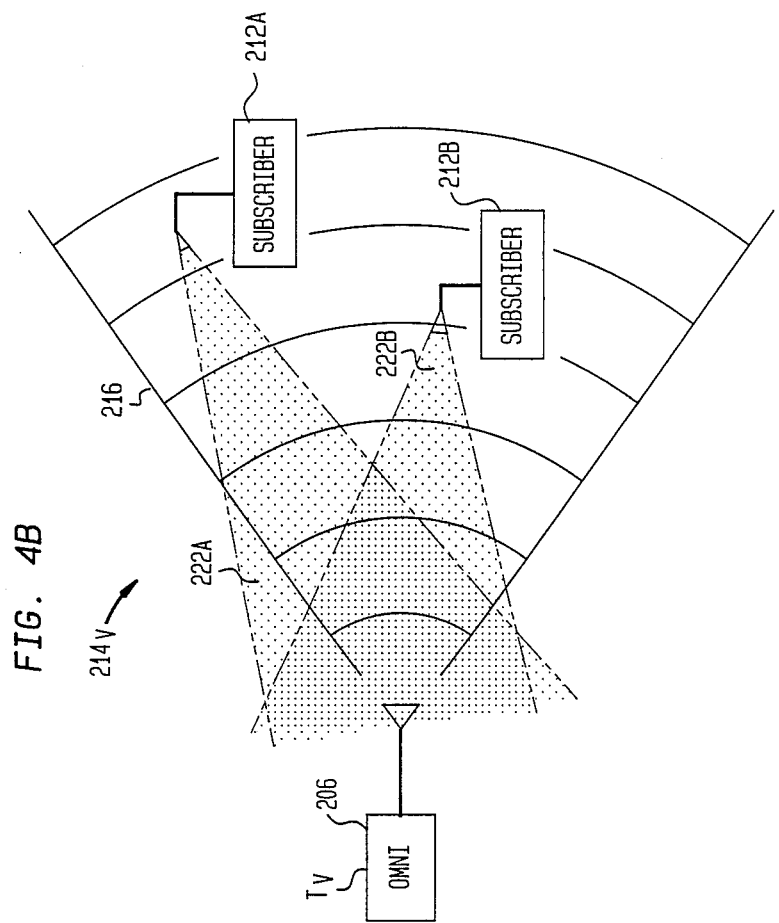

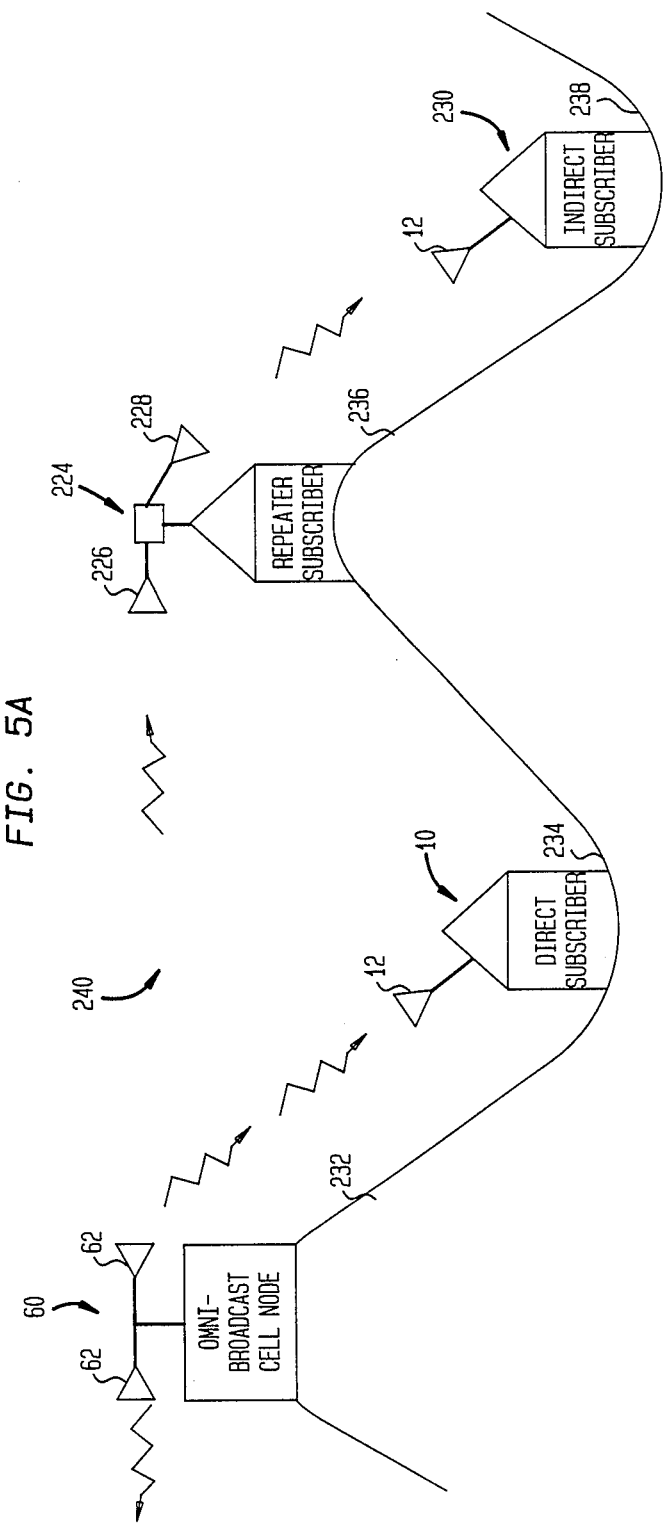

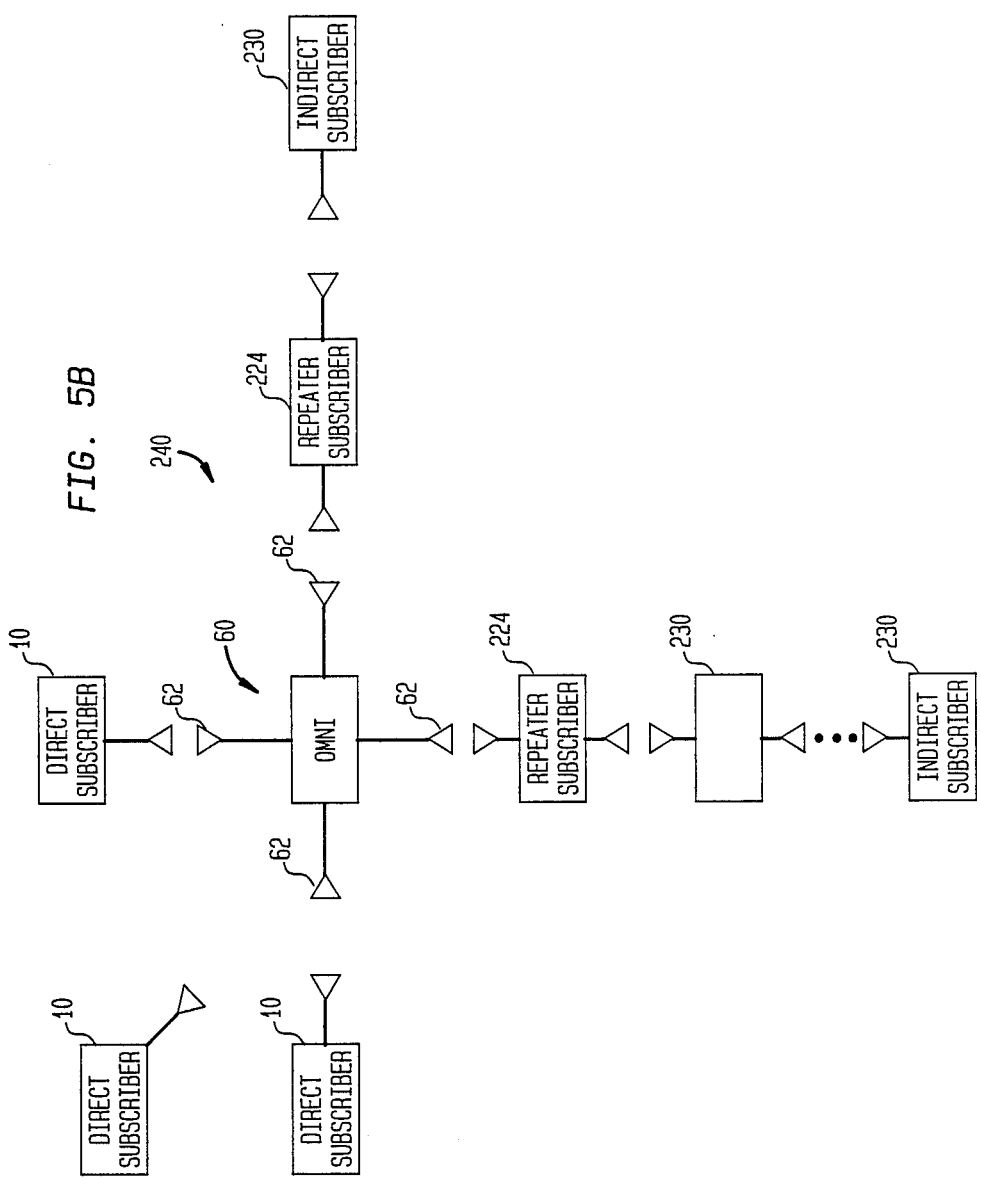

LOW POWER MULTI-FUNCTION CELLULAR TELEVISION SYSTEM

BACKGROUND OF THE INVENTION

1. Field of the Invention

The invention relates to a low power, point to multipoint, multi-function cellular television system.

2. Description of Related Art

Low power television has been the object of many recent investigations. A useful discussion can be found in the article entitled "Low-Power Television—Short Range, Low Cost TV Stations are in the Offing as the FCC Prepares to Establish Broadcast Requirements" that appeared in the IEEE Spectrum, Pages 54 through 59, June 1982.

Multi-point radio communication is discussed in some U.S. Patents, including U.S. Pat. No. 4,528,656. There are also existing applications for polarization diversity between transmitting and receiving antennas. It is known that two way satellite communications often involves the use of vertically or horizontally polarized signals which communicate respectively with vertically and horizontally polarized signals from earth. There also exists some limited circumstances where individual horizontal and vertical diversity is employed. See for example, U.S. Pat. No. 2,288,802 which describes a system of transmission between two stations wherein vertically polarized waves travel in one direction and horizontal polarized waves travel in another. However, it should be noted that the concept of polarization diversity is normally limited to two transmitting stations and not to arrays of receiving and transmitting antennas.

The use of directional antennas is found in certain contexts. Note, for example, U.S. Pat. No. 3,041,450 which describes the use of a directional receiver for receiving a signal from an omni-directional transmitting antenna. Other patents that discuss polarized modulation or the use of horizontal vs. vertical polarization in the context of radio transmissions include U.S. Pat. Nos. 2,992,427; 3,882,393; 4,220,923; 4,321,705 and 4,521,878.

U.S. Pat. No. 4,495,648 is of possible relevance in that it appears to disclose a concept for monitoring a radio signal at a distant location and then modifying the transmission to adjust the output power of the originating transmitter. Phase-lock loops are occasionally used in the context of radio receivers. Note for example, U.S. Pat. No. 4,228,540.

One major problem associated with low power television and high frequency transmissions is fading due to rainfall and the like. A brief discussion of that problem is found in U.S. Pat. No. 4,313,220 entitled CIRCUIT AND METHOD FOR REDUCING POLARIZATION CROSS-TALK CAUSED BY RAINFALL.

Lastly, U.S. Pat. Nos. 3,864,633 and 4,525,861 may be of general relevance.

While certain elements of the present invention may be found in other contexts, insofar as can be determined, none of the relevant literature suggests a low power multiple carrier cellular television system having the efficiency and lack of distortion of the invention set forth in this disclosure.

SUMMARY OF THE INVENTION

Briefly described the invention comprises a low power cellular television system that employs polarization diversity to substantially decrease intermodulation distortion. An array of transmitting antennas is organized such that horizontally and vertically polarized transmitters alternate throughout the system.

Each receiver with its appropriate narrow beamwidth antenna is directed at a specific transmitting antenna and adapted to receive signals only of the frequency and polarization of the transmitting antenna. The system preferably operates in the 27.5 to 29.5 GHz millimeter waveband thereby providing broad bandwidth but relatively short, line of sight transmission distances. Substantial isolation is achieved between neighboring transmission systems by means of polarization, amplitude adjustment, modulation techniques, frequency and space diversity as well as through the use of high Q filtering. Intermodulation levels are controlled by adjusting the multiple input levels of the receiver. Due to the substantial isolation between alternate communication carriers and broad bandwidth of the system it is possible to provide a variety of additional services such as two-way television, both for public and private programming, digital two-way transmission, special video teleconferencing, radio programming and telephone service. If the transmission from the transmitter to the receiver is made with vertically polarized signals, then the receiver will preferably transmit back with horizontally polarized signals. Individual transmitters and receivers include novel circuitry that further increases the selectivity and isolation of the system as a whole. Given the substantial electrical isolation of individual transmitters and receivers it is possible to establish a system which covers a large area without interference on the multiple receivers.

These and other features of the invention will be more fully understood by reference to the following drawings.

BRIEF DESCRIPTION OF THE DRAWINGS

FIG. 4B illustrates the relationship between two or more subscriber receiving stations and their common omnidirectional antennas within a given cell of the system.

FIG. 5A illustrates an extended cell employing a repeater station to extend the range of the system.

FIG. 5B is a plan view of an extended cell such as illustrated in FIG. 5A.

DETAILED DESCRIPTION OF THE INVENTION

During the course of this description like numbers will be used to identify like elements according to the different figures which illustrate the invention.

Figure 1A:
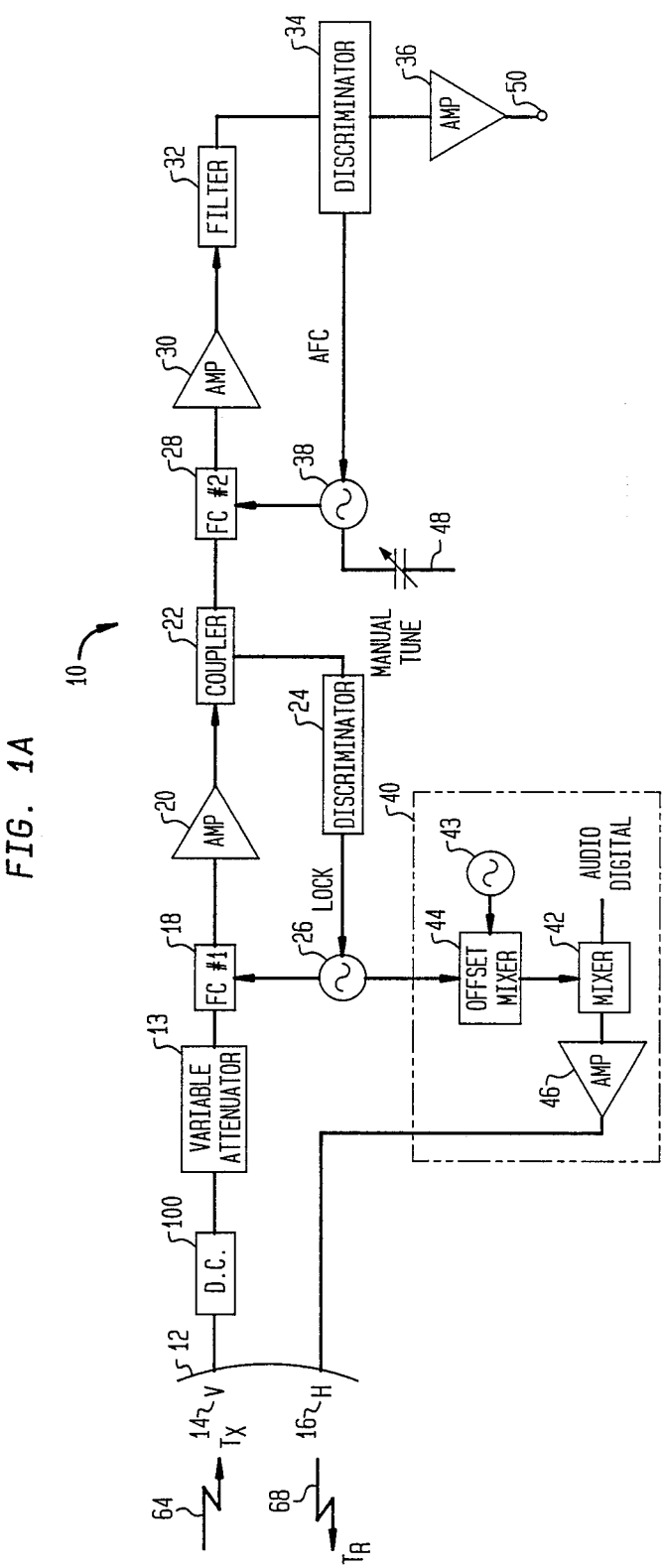
FIG. 1A is a schematic diagram of a receiver according to the preferred embodiment of the invention.
Figure 2:
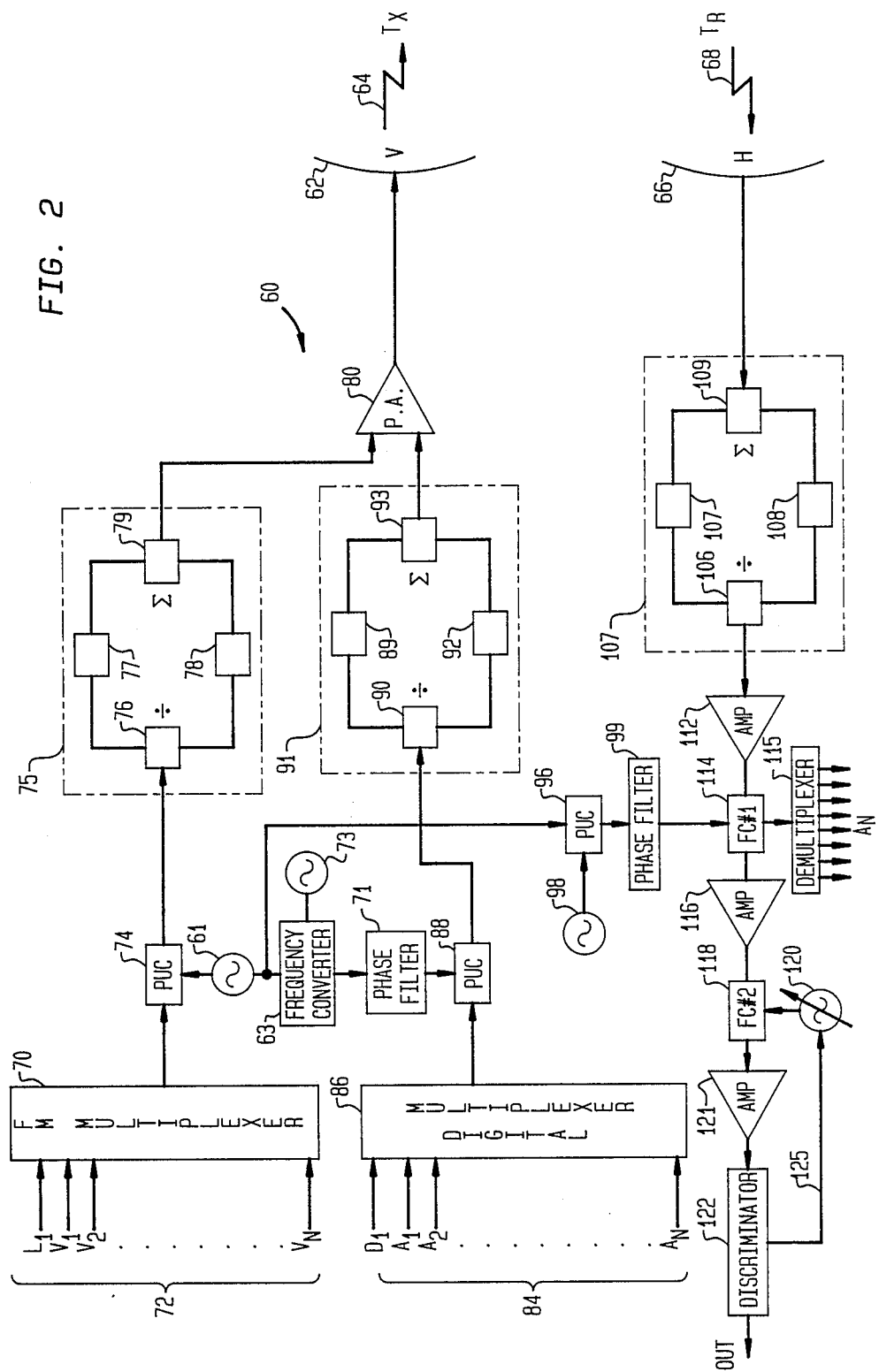
FIG. 2 is a schematic diagram of the transmitter according to the preferred embodiment of the invention.
Figure 3:
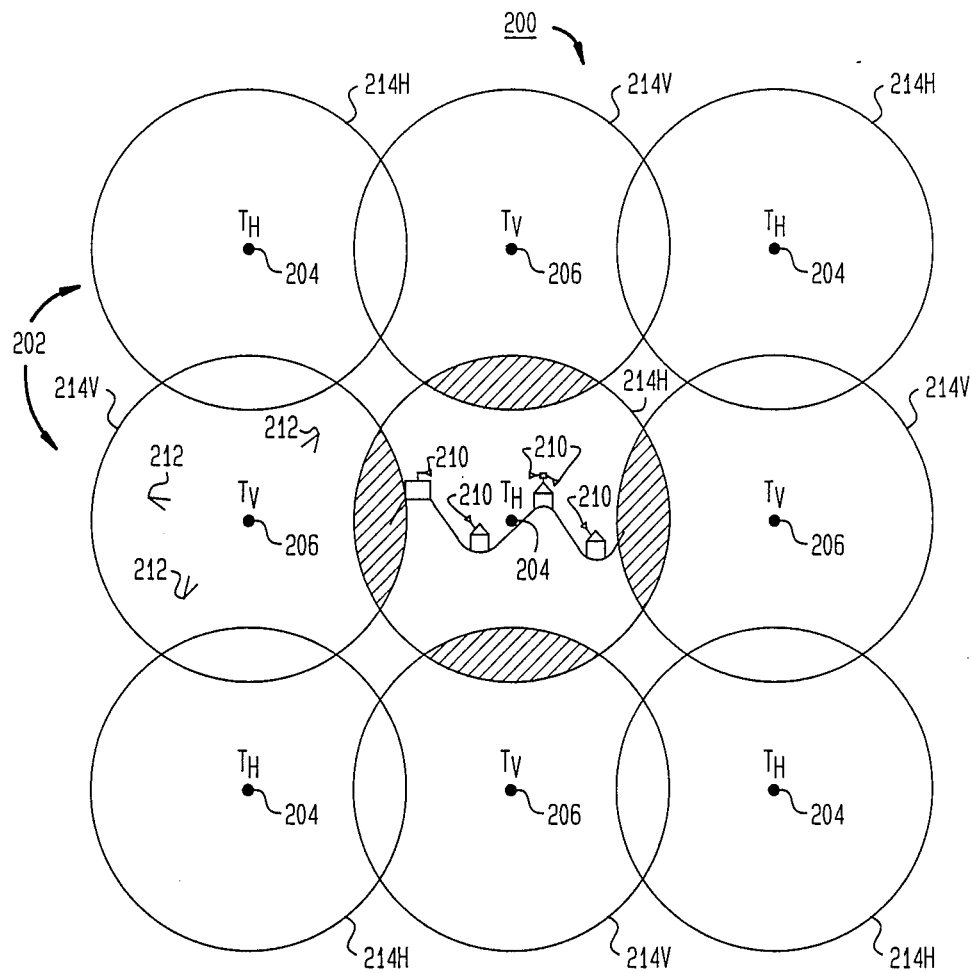
FIG. 3 is a top plane view illustrating the overall organization of the antenna array with respect to individual transmitter and receiver stations.

It is easiest to understand the invention by first focusing on the smallest common element, namely the receiver 10 illustrated in FIG. 1A and then working up through the transmitter system 60 illustrated in FIG. 2 to the overall system 200 illustrated in FIG. 3. Each receiver 10 according to the preferred embodiment of the invention includes an antenna 12 having elements 14 and 16 for receiving vertically polarized signals Tx 64 and transmitting horizontally polarized signals Tr 68 respectively. Accordingly, antenna 12 is used for polarization diverse transmission and reception that may be implemented either by two separate antennas having two different polarizations or by a single antenna 12 combining the two polarization capabilities as illustrated in FIG. 1A. Local oscillator 26 generates a signal that is mixed with the incoming 27.5 to 29.5 GHz modulated carrier in a first frequency converter FC#1 18 to produce in the case of television reception a 200 to 2200 MHz frequency modulated band containing a number of video signals with audio subcarriers. The output signal is amplified by amplifier 20 and directly coupled through coupler 22 to a second frequency converter FC#2 28. A portion of the signal from the first frequency converter FC#1 18 is fed back to local oscillator 26 through discriminator 24. The voltage fed back to local oscillator 26 controls its frequency so as to lock it to the master oscillator frequency $L_1$ at the omni-directional transmitter station 60 illustrated in FIG. 2. Accordingly, discriminator 24 and local variable oscillator 26 form part of a phase locked loop. Thus, even if a given omni-directional transmitter 60 drifts as a function of temperature or time, all receivers 10 will track it without the need for expensive crystal controlled master oscillators or local oscillators within the receivers 10 themselves. Signals from the second frequency converter FC#2 28 are fed through amplifier 30 and filter 32 to discriminator 34. A portion of the signal from discriminator 34 is fed back to manually tunable local oscillator 38 whose output is also fed back as a second input to the second frequency converter FC#2 28. Oscillator 38 is manually tunable by control 48. The foregoing demodulation invention is especially efficient and low cost in that only one specific signal is selected through the use of manually tuned oscillator 38 and the automatic frequency control (AFC) loop in which it is found. Amplifier 36 amplifies the signal from discriminator 34 and produces an amplified output at terminal 50. Nearly all interfering oscillators from other cells will vary at different frequency rates in a random fashion thereby being further attenuated by the strong signal capture characteristics of oscillator 26 dictated by the prime amplitude modulated signal in the principle cell. The result is an amplitude modulated signal at discriminator 34 which coincides with the standard VHF television channels 3 or 4 on a video monitor receiver. Accordingly, the signal at output terminal 50 can be fed directly to a standard television receiver.

| Element Number | Element Name | General Description | Vendor |
|---|---|---|---|
| 12 | Antenna | Dual polarization 1 to 2 Ft dia. horn 2" to 6" Stripline (duroid) array [gain and directivity on area] Frequency 27.5 to 29.5 GHz | MA/COM Seavey (Feed) Ball Brothers |
| 100 | Directional coupler | 10 dB directional coupler | Krytan |
| 13 | Variable attenuator | 0 to 20 dB attenuation WR 28 waveguide | Narda |
| 18 | Frequency Converter | Conversion loss, Lc = 10 dB max FLO = 27.3 GHz Local oscillator, drive > +10 10 dBm < +15 dBm VSWR 2:1, noise figure 12 dB, max Dynamic Range (1 MHz bandwidth) = 110 dB | TRW Microwave RHG MA/COM |
| 20 | Amplifier | Gain 20 to 40 dB frequency 200 to 2200 MHz 1 dB compression (output) +15 dBm | Mini circuits Trontech |
| 22 | Coupler | 10 dB to 20 dB, frequency 200 to 2200 MHz | Narda Microlab FXR |
| 24, 26 | AFC Oscillator | Frequency 27.300 GHz Power output +15 dBm lock range 30 MHz | MA/COM Gunnplexer |
| 28 | Frequency Converter | Frequency 200 to 2200 MHz double balanced image rejection, dynamic range (1 MHz bandwidth) = 110 dBm Local oscillator 130 to 2130 MHz, Noise figure 15 dB max. | RHG Trontech |
| 30 | Amplifier | Frequency 200 MHz, AGC, Gain 20 to 40 dB | Trontech |
| 34, 38 | Oscillator | Mechanically tuned plo frequency 130 & is to 2130 MHz (could be in 2-4 bands) power output +15 dBm | Multiple Vendors |
| 36 | | 20 dB video amplifier frequency 0 to 6.5 MHz | Multiple Vendors |
| 11 | Antenna | Same as 12 except single polarization | See above Antenna 12 |
| 313 | Variable Attenuator | WR-28, WG, 0 to 20 dB | Narda |
| 318 | FC #1 | Conversion loss 10 dB max noise figure 12 db | TRW RHG Time MW |
| 320 | Amplifier | G = 20 dB, N.F. = 2.5 dB freq. 940-1440 MHz or freq. 440-940 MHz | Trontech Tx Engr. |
| 321 | Receiver | Freq. = 940-1440 MHz or = 440-940 MHz | Scientific Atlanta Tx Engr. General Instrument Adams Russell |

Figure 1B:
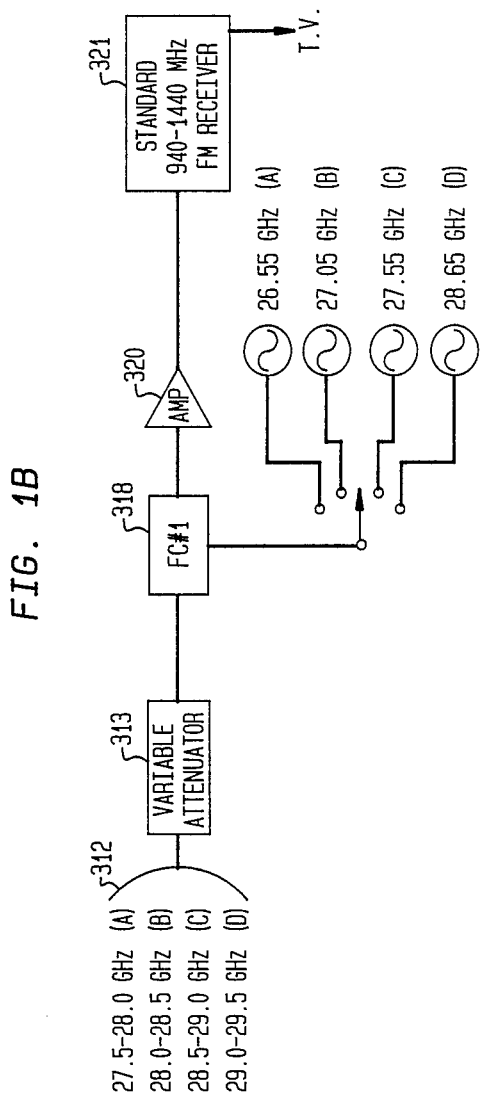
FIG. 1B is a schematic diagram of an alternative frequency plan.

An alternate frequency plan scheme utilizing the same basic concept is to divide the incoming 27.5 to 29.5 GHz signal band into four equal 500 MHZ segments as shown in FIG. 1B. This alternative system can employ fixed cavity stabilized oscillators or the frequency control system outlined previously.

| Element Number | Element Name | General Description |
|---|---|---|
| 313 | Variable attenuation | Automatic level adjustment |
| 318 | Frequency Converter | Balanced or double balanced in order to achieve 60 dB image rejection conversion loss 7 dB max single sideband noise figure 10 dB max (with IF N.F. = 2.5 dB VSWR 1.5:1 L.O. level +10 dBm per |

| Element Number | Element Name | General Description |
|---|---|---|
| 320 | Amplifier | pair diodes<br>Gain = 16 dB min<br>Noise figure 2.5 dB max<br>1 dB gain compression =<br>10 dBm, input/output VSWR<br>1.5:1, reverse isolation<br>30 dB |
| Local | Oscillator | Power output +16 dBm or<br>+10 dBm (balanced or double balanced), frequency<br>tunable 26.55–28.05 GHz<br>with AFC to L1 (or cavity stabilized fixed frequency) |

A two-way transmission format is made possible by employing the horizontal polarization transmission portion 16 of the antenna 12. The local system oscillator 26, which is frequency synchronized to one amplitude modulated carrier among the multiple frequency modulated carriers of the omni-directional transmitter 60, is used to drive offset mixer 44 which also receives an input from the fixed offset oscillator 43. The resultant signal is mixed in another mixer 42 with the digitized and/or amplitude modulated audio signal the result of which is amplified by amplifier 46 and transmitted in the horizontal polarization mode by antenna element 16 as signal Tr 68.

Ghosting due to multipath propogation is eliminated because of the high selectivity narrow beamwidth of the receiver antenna 12 which is preferably placed facing the direction of the strongest transmitting antenna 62 in the array. The beamwidth of the preferred embodiment of the receiver antenna 12 is approximately 1 to 2 degrees which is sufficiently narrow when combined with a system of alternately horizontal and vertically polarized transmitting antennas $T_H$ and $T_V$ as shown in FIG. 3 to substantially eliminate distortion. Lower gain and/or wider beamwidth antennas may be used for receivers which are located nearby the transmitting antennas. Since all desired signals should be appearing at the antenna 12 at the same level, the intermodulation level of the system 200 is controlled by adjusting the signal to noise level of the system to a predetermined value. For input signals of −40 dBm (32 dB greater than that required for excellent video quality in an FM system) and a local oscillator level of approximately +10 dBm, the expected fourth order in-band intermodulation levels would be approximately −110 dBm which is below the noise level for a typical receiver with a −72 dBm minimum acceptable signal level for excellent quality video. Cellular power levels can be maintained throughout various levels of rainfall by a receiver re-transmitter at fringe areas which feeds information back to the omni-directional transmitters 60 to change their output power or by automatic adjustment of the variable attenuator 13 for receivers not in fringe areas.

A block diagram schematic of the preferred embodiment of the transmitter 60 is illustrated in FIG. 2. Transmitter 60 is at the omni-directional radiating node of a group of cells 214H and 214V in geographical array 200 illustrated in FIG. 3. A pair of multiplexer circuits 70 and 86 are used to provide frequency and digital multiplexing of a variety of signals which are to be radiated from omni-directional antenna 62. A group of signals 72 including $L_1, V_1, V_2, \ldots V_n$ are fed into FM multiplexer 70 producing a modulation band of information in the frequency range of 200 to 2200 MHz. The output band is converted by up-converter PUC 74 to the frequency range of 27.5 to 28.5 GHz according to the present example. Simultaneously an equal spectrum of digital signals 84 comprising inputs $A_1, A_2 \ldots A_n$ are multiplexed in digital multiplexer 86 and up-converted in PUC 88 to frequencies in the range of 28.5 GHz to 29.5 GHz. The 27.5 to 28.5 GHz signal from PUC 74 is filtered by phase filter 75 and fed as a first input to power amplifier 80. A second phase filter 91 receives the 28.5 GHz to 29.5 GHz output from PUC 88 and supplies a second input to power amplifier 80.

The phase filter design 75 utilizes both the amplitude and abrupt phase shift characteristic of an LC network, 77, to provide a performance characteristic which is substantially better than that achievable with the same LC network used in normal configuration. See FIG. 6. The phase network 75 when used to synthesize a band reject filter characteristic results in a typical rejection performance which is 50 dB using typical resonator Q's of 100. This compares to a conventional band reject filter performance of only 16 dB using LC filter elements with the same Q of 100.

The input signal coming into phase filter 75 is divided by a power splitter transformer, 76, into two paths; one containing an LC network 77 and the other an amplitude adjustment 78. LC network 77 could comprise an inductor, a capacitor and a resistor in series. Amplitude adjustment circuit 78 could comprise a conventional variable resistor. The output of these paths is then combined (i.e., added) by a power splitter 79 similar to power splitter 76.

The performance characteristic of a network using 77 and 78 as described above is $$G = \frac{Rx - r}{(r + RL)(Rx + RL)}$$

$$G = o \text{ for } r = Rx$$

The resultant is a band pass filter network achieved by adding a 180 degree phase shift to one of the paths of the filter which exhibits a band reject characteristic with a rejection point substantially greater than that of a conventional filter with similar elements due to the vectorial cancellation.

Figure 6:
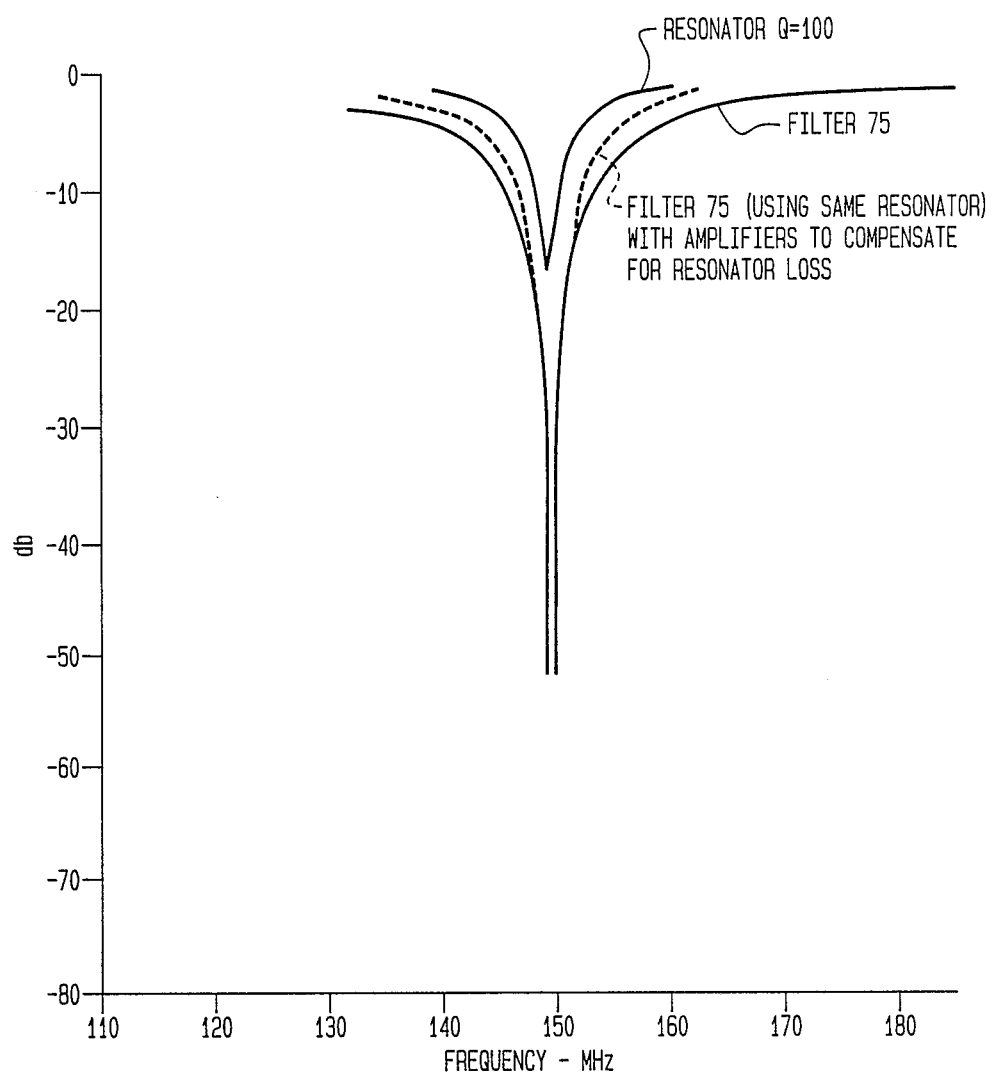
FIG. 6 is a graph of the characteristic of the improved transmitter phase filter.

Typical performance compared to conventional network using L=520.5 nH, C=2.12 pF is given in FIG. 6. Phase filter networks 91 and 107 work in the same manner as phase filter 75 just described.

The resulting 2 GHz (29.5−27.5 GHz) of information bandwidth is amplified by linear power amplifier 80 and then radiated to a large number of system subscribers 10 within the geographic cell 214H or 214V near omni-directional antenna 62 or via a small number of quadrant directional antennas. Omni-directional antenna 62 produces a vertically polarized transmitted signal Tx 64 which is received by the vertically oriented element 14 of each of the directionally oriented receiver antennas 12. The specific subdivision of 2 GHz of available bandwidth given in this example may vary with particular cells 214H and 214V within the system array 300, according to the need for and mixture of video and digital transmission requirements.

Up converters PUC 74 and 88 are balanced so that the frequency of master oscillator 61, for purposes of this example operating at 27,300 MHz is suppressed. A lower side band of frequencies is redundant to the transmission and are eliminated by the two differential phase shift filters 75 and 91. If more lower side band reduction is required to minimize interchannel interference, then a double balanced mixer will be used.

Figure 4A:
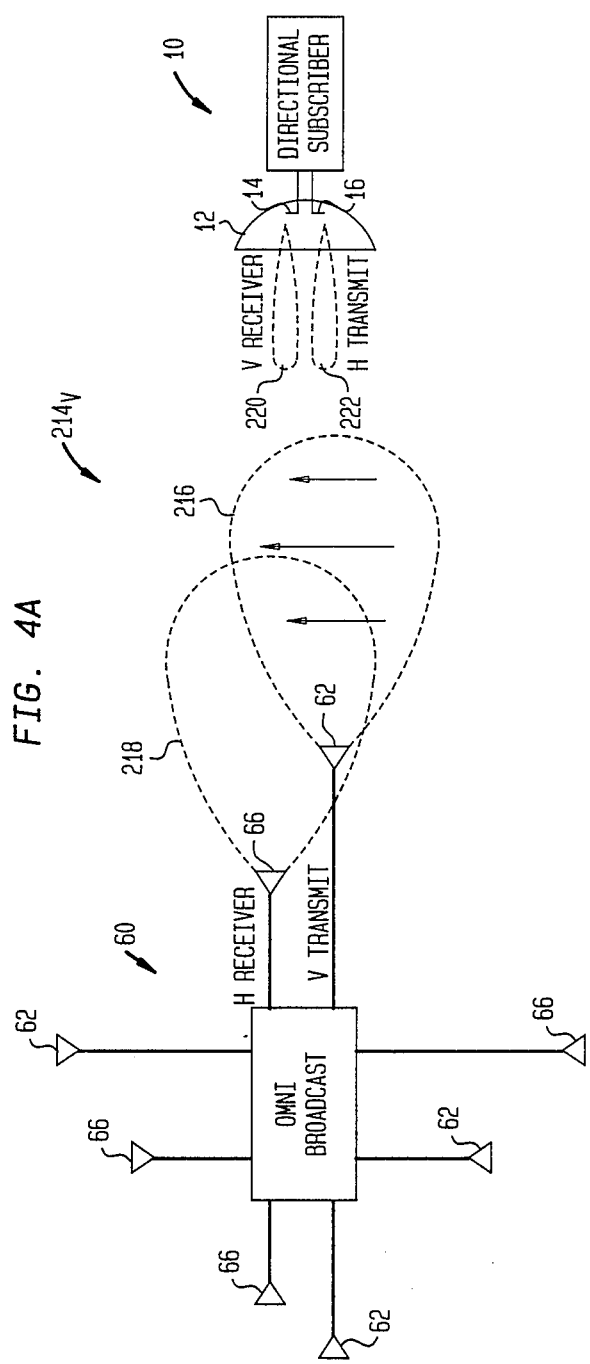
FIG. 4A illustrates the spacial diversity of transmitter and subscriber receiver antennas within a given cell of the system.

The foregoing technique permits a wide variety of signal formats to be efficiently combined into a single millimeter wave carrier. This form of multiplexing allows, for example, for the use of low frequency oscillators with moderate stability (for example one part in ten to the fourth power at 100 MHz) to be translated into a variation at 28,000 MHz of 3.7 parts in 10 million assuming the oscillator locking scheme previously described. The omni-directional broadcast transmitter 60 functions as the master node of each cell 214H or 214V and simultaneously acts as a receiving site for signals radiated back from individual subscriber receivers 10. The return signals $T_R$ 68 may represent a variety of communication services including, but not limited to, telephone digital data communications and video conferencing. Because of the large absolute signal bandwidths available in the millimeter frequency range, for example, up to 500 MHz of signal bandwidth might be allocated to this return path according to the specific needs of a particular local community. A variety of signal formats as well as simultaneous telephone channels can be accommodated. The receiver channel is isolated to a large extent by the polarization diversity between vertically transmitted signal $T_X$ 64 and horizontally polarized received signal $T_R$ 68. Further isolation is achieved by the frequency diversity of the transmitted signal $T_X$ 64 and the received signal $T_R$ 68 and by the space displacement of the multiple ring locations of the transmitter and receiver antennas as shown in FIG. 4A. The transmitter antenna is always located forward of the receiver antennas. Any residual transmitter energy entering the received signal port 68 through reflections that is not severely attenuated by polarization will be sharply filtered using another differential phase shift filter 107 before being amplified by low noise intermediate microwave amplifier 112 and down converted by frequency converter FC#1 114 to a wide bandwidth of signals. The dynamic range of FC#1 is increased by using a large oscillator power at 114 and or multiple mixer diodes. This additional linearity minimizes intermodulation distortion due to the reception of multiple desired signals of unequal level or the unintentional reception of transmitter leakage. The intrinsic differentiation between frequency and amplitude modulation signal further reduces the effect of distortion and retains the fidelity of the system. Since the incoming signals are from a multitude of transmitters located at various distances from the receiver 68 the use of an input variable attenuator 13 as in the receiver is not desired. The output frequencies can then be demultiplexed by demultiplexer 115 and switched to retransmission format An. Individual carrier signals from frequency converter FC#1 114 are also amplified by amplifier 116 and forwarded to another frequency converter FC#2 118. The output from frequency converter FC#2 118 is amplified by amplifier 121 and forwarded to discriminator 122 the output of which is individual demodulated carrier frequencies. A portion of the signal from discriminator 122 is fed back through feedback path 125 of a locking signal to variable oscillator 120 thereby stabilizing the oscillator to the input frequency converter FC#2 118. Therefore the channel to be monitored is determined by the manual adjustment of 120 and feedback path 125 which provides automatic frequency control on a single channel basis. Oscillator 120 is preferably a free running mechanical or electronically controllable variable oscillator. The Multiple digital coded signals An's, are transmitted periodically with various codes in order to activate or deactivate the individual receivers 10 located within the cells 214H or 214V. Frequency converter FC#1 114 receives its second input from up converter 96 through phase filter 99. Up converter 96 receives one input from oscillator 61 and a second input from an offset oscillator 98. Another portion of the signal from oscillator 61 is filtered through phase filter 71 to up converter PUC 88. Another offset oscillator 73 provides a second input to phase filter 71.

| Element Number | Element Name | General Description | Vendor |
|---|---|---|---|
| 70 | Multiplexer | Multichannel FM multiplexer using modified standard models as special designs. Could be standard unit presently used by cable industry. | Standard Unit |
| 74, 88 96 | Up converter | High level up converter for 27.5 to 29.5 GHz | TRW Trontech |
| 61 | Local Oscillator | Gunn oscillator fixed at difference frequency between 75 and 70 maximum 70 input level 1mw | MA/COM |
| 75 | Filters | See FIG. 2. | See FIG. 2 |
| 80 | Power Amplifier | Frequency 27.5–29.5 GHz power output 1 WATT or 60 WATTS | Higher |
| 107, 91, 71, 99 | Filter | Special design | See FIG. 2 |
| 112 | Low noise HEMP Amplifier | Gain 20 dB N.F. 3 dB frequency 27.5 to 29.5 GHz | See FIG. 2 |
| 114 | Frequency converter | Dynamic range 100 dB N.F. = 12 dB | Trontech |

An understanding of the details of the subscriber receivers 10 and the omni-directional transmitter stations 60 is important to an understanding of the system 200 illustrated in FIG. 3 as a whole. The array 200 of transmitting antennas is comprised of horizontally polarized antennas $T_H$ 204 and vertically polarized antennas $T_V$ 206 each inside a cell 214H or 214V respectively. The various transmitting antennas $T_H$ and $T_V$ could have random frequency variations thereby offering additional interference reduction from receivers in adjacent cells or could be amplitude controlled depending upon terrain and or weather conditions thereby also minimizing adjacent cell interference and allowing for a backbone network in which the said cells are slaved to a master cell in the backbone network. The specific transmitter 60 illustrated in FIG. 2 transmits a vertically polarized signal $T_X$ 64 such as might be transmitted by antenna 206. Accordingly, antenna 62 illustrated in FIG. 2 is essentially identical to any one of the vertically polarized antennas 206 in FIG. 3. Horizontally polarized antennas 204 are preferably positioned in the regular array such that its nearest neighbor is a vertically polarized antenna 206 rather than a horizontally polarized antenna 204. Therefore, when moving in any direction through transmitting antenna array 200 one will encounter alternating antennas 204, 206, 204, 206, 204, etc. Each omni-directional transmitting antenna 204, 206 has associated with it a group of receiving antennas including horizontally polarized antennas and vertically polarized antennas. Horizontal receiving antennas are adapted to receive horizontally polarized signals from horizontal transmitting antennas 204. Likewise vertically polarized receiving antennas are adapted to receive vertically polarized signals like $T_X$ 64 from antennas 206 which are similar to antennas 62 illustrated in FIG. 2. The relatively narrow beam width of the receiver antenna directed toward the central transmitter 204 will minimize the interference from cell 214H. Each individual transmitting antenna $T_H$ or $T_V$ 204 or 206 forms the central node of a cell 214H or 214V which typically includes one or more subscriber stations 210 or 212.

A typical cell 214V in its simplest form is illustrated in FIG. 4A. An omni or quadrant directional broadcast-/receiver system 60 using low gain, space diversity antennas 62 and 66 is directed towards a high gain subscriber, dual polarization receiver 10 equipped for polarization diversity transmit/receive isolation. Vertically polarized transmitter antenna 62 produces a transmission pattern 216 that is received within the reception field 220 of subscriber antenna element 14. Similarly, transmission from the subscriber station 10 emanates from antenna element 16 as a horizontally polarized signal 222 (like $T_R$ 66) which is received within reception field 218 of transmitter receiving antenna 66. FIG. 4B illustrates a cell 214 in which two subscribers 212A and 212B communicate with a single omni-directional transmitter $T_V$ 206. In this case the transmitter $T_V$ 206 produces a vertically polarized substantially omni-directional signal 216 which is received by receivers 212A and 212B. Subscribers 212A and 212B respond back with narrow divergence, 2 degree, horizontally polarized signals 222A and 222B respectively which are received by node transmitter $T_V$ 206.

Figure 1C:
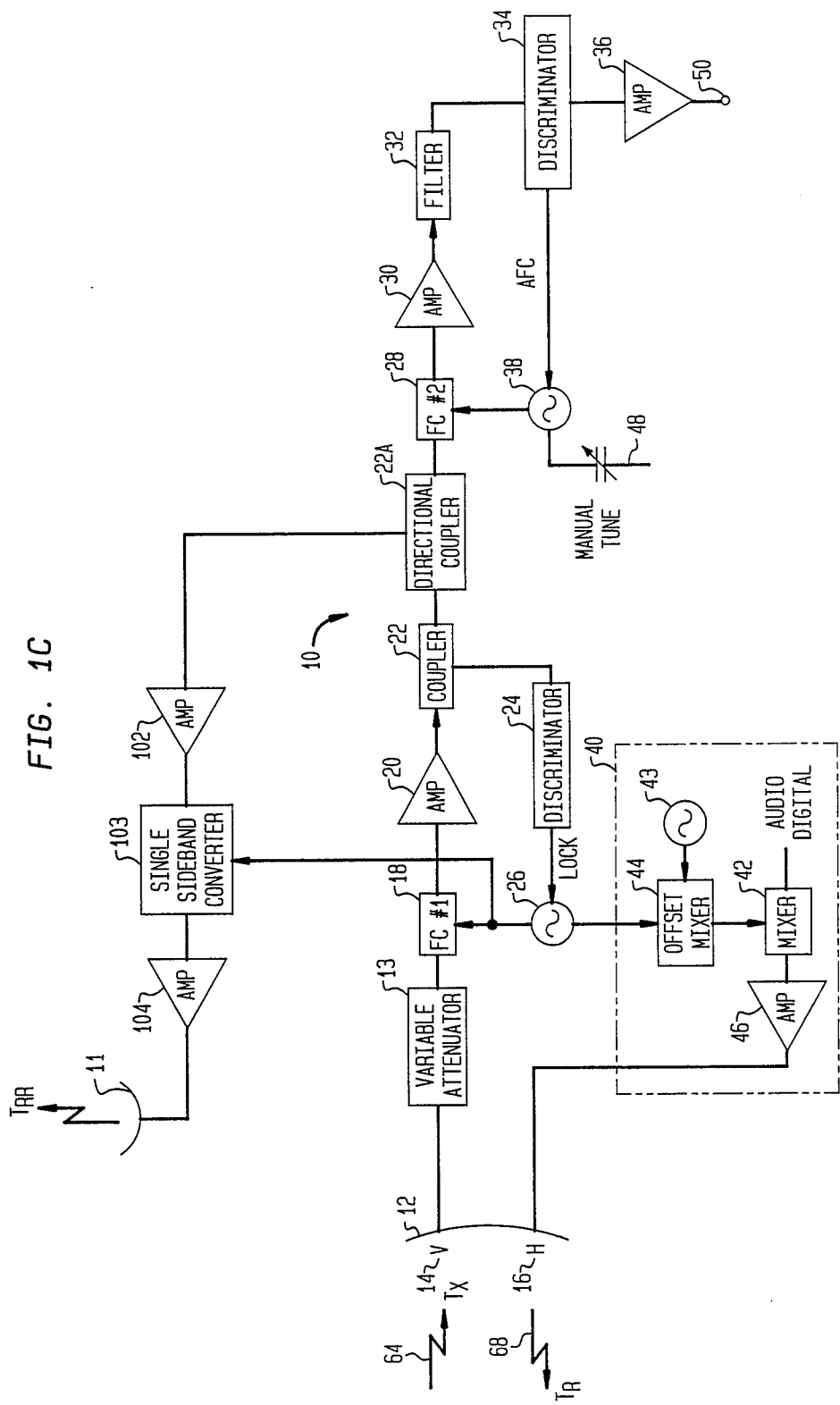
FIG. 1C is a schematic of a receiver having repeater rebroadcast capabilities.

The reception within an individual node 214 can be improved by means of repeaters so as to cover those areas masked by various obstacles between transmitter and receiver sites. The directional coupler 22A located in certain receiver repeaters, FIG. 1C, is used to couple the received intermediate block signal by use of amplifier 102, up convert it by single sideband converter 103, and amplify again by amplifier 104 at millimeter wave frequencies. This signal is retransmitted by antenna 11 at an orthogonal polarization to the received signal, in this case horizontal, to other subscribers which may be masked from the central node signal. Since the received signal Tx has a vertical polarization the retransmitted signal $T_{RR}$ has a horizontal polarization.

| Element Number | Element Port | Specification |
| --- | --- | --- |
| 102 | Amplifier | Gain 75 dB typ. ALC power output = +10 dBm 1 dB compression = +23 dBm |
| 103 | high level converter | Lc 8 dB Pin = +10 dBm L.O. drive = +17 dBm |
| 104 | HEMP Amplifier | Power output +16 dBm (1 dB compression) Gain 15 dB |

This is an ideal method to cover streets in a city with large buildings on either side. An extended cell system 240 is illustrated in FIGS. 5A and 5B. FIG. 5A an omni or quadrant broadcast transmitter system 60 located on a first hill 232 produces a vertically or horizontally polarized signal from antenna 62. A typical direct subscriber receiver system 10 located in first valley 234 receives the signal through its antenna 12. So far the system thus described is identical to the system disclosed in FIGS. 1 through 4B. However, an indirect subscriber 230 located in a second valley 238 behind a second hill 236 is shielded from the signals of transmitter 60 and under normal conditions would not be able to receive its signals. By placing a repeater 224 on top of second hill 236 it is possible to relay signals from transmitter 60 to the indirect subscriber 230. Signals from omni-transmitter 60 are received by repeater antennas 226 and retransmitted out of antenna 228 to antenna 12 of the indirect subscriber 230. In this manner the effective range of omni-directional transmitter 60 is substantially increased by the use of complimentary polarization repeaters 224. Repeaters 224 may be independent stand alone units or may be incorporated into the receiver system 10 of the subscriber. Theoretically the range of an individual transmitter cell 214 can be extended by the use of a large number of repeaters 224 limited only by the noise reproduction at each repeater. Low power HEMP devices should enable in the multiple rebroadcast of a single central mode transmitter. FIG. 5B illustrates in a schematic top plan view how an omni-directional transmitter 60 can be located at the center of a mixed cell node including direct subscribers 10, indirect subscribers 230 and subscriber repeaters 224. The ability to extend a mixed system 240 depends significantly upon the terrain and population characteristics of the environment. For example, in a major urban area it would probably be desirable to have a closely packed array having omni-directional low power transmitters 60 alternating between vertically and horizontally polarized signals regularly spaced throughout the system. Alternatively, in more rural areas it is probably desirable to expand the area of an individual mixed cell node thereby spreading out the size of the overall system 24. Repeaters 224, utilizing high gain antennas, are preferably of the low gain variety which provide ducting of the omni-directional radiated signal along paths to receiver sites 230 which do not lie on a straight line with the omni-directional antenna 62 of the transmitter system 60. In the process of providing the signal repeat function, the repeater transmitter antennas 226 and 228 will preferably alter the polarization of the output signal to prevent multi-path fading as might occur when the repeat signal mixes with a direct signal from the omni antenna site 60.

Because of the inherently broad bandwidth capability of the multifunction cellular system 200, it may be desirable to distribute and routinely upgrade a unique set of customer authorization codes by which user sites can be authorized to receive any desired set or subset of programming and two way transmission system services. For example, once per day or even once per hour a new set of codes could be radiated to all individual users enabling those who subscribe to qualify them to receive special broadcasts or to participate in special system services such as video conferencing and so forth. Effective two way capability is not readily provided in prior art cable systems because of the need for numerous two way cable system amplifiers. However, this function can be achieved with the present invention economically in millimeter wave cellular system 200 because each site 10, 224 and 230 can have its own low power transmitter in the range of approximately 50 to 100 milliwatts. That power combined with the high gain of the receiver site antenna, typically in the range of 30 to 40 db, and narrow noise bandwidth gives them an effective radiated power (ERP) commensurate with that of the omni-directional transmission site 60. Thus two way high quality transmission and reception of signals between the master site 60 and the user sites 10, 224 and 230 is possible on a simultaneous basis.

A variety of other uses for the capabilities of the system 200 can be envisioned. For example, while receiving any selected television channel a user 10 could simultaneously be transmitting digital data back to the central site 60 containing orders for purchase that the subscriber may wish to make from stores and other vendors who subscribe to the system 200. Alternatively and simultaneously the subscriber might be transmitting digital data to the subscriber's bank or broker with specific banking and stock purchase orders. The relatively narrow beam width of the receiver antenna 210 directed toward the central transmitter 204 will minimize the interference from cell 214H. Finally, the subscriber might be communicating via telephone, carried by the system 200 rather than twisted pair telegraph wires, to the central node 60 which in turn could be patched to the public telephone network. Again, because of the frequency, polarization and space diversity aspects of the system 200, full two way communicative capabilities exist in a simultaneous fashion between any and all users 10, 224 and 230 and each central node 60 of the cellular site 200.

In summary, the system 200 is a means for providing communities, subdivided into approximately 10 mile diameter cells 214, a variety of two way communication services including television, both for public and private programming, digital two way transmission, special video teleconferencing, radio programming, and telephone services. This variety of simultaneous communication services is possible because of the broad bandwidth available in the 27.5 to 29.5 GHz millimeter wave bands, the unique method of providing very high Q filtering, ghosting reduction and the ability to transmit and receive numerous simultaneous signals with little or no intermodulation distortion or interaction with a moderate cost receiver.

The characteristics of the present system 200 have overcome prior art difficulties through a unique combination of separate techniques.

Polarization diversity is employed within individual cells to provide a measure of isolation between the omni-directional broadcast signals from stations 60 and the signals which return from the user sites 10, 224 or 230. For example, polarization might be used for omni-directional transmission and horizontal polarization used for signals returning from individual receiver sites 10, 224 or 230 to the omni-directional broadcast site mode 60. Adjacent geographic cells then use the reverse order of polarizations, in this case horizontal polarizations for transmission from the omni-directional transmission site 60 and vertical polarization for the signals returning from individual subscriber receivers 10, 224 and 230 to the omni site 60. In this manner polarization diversity has been used to provide maximum isolation between transmitted and received signals within a given cell 214 as well as to isolate adjacent transmission sites 60 from each other. Moreover, rebroadcast low gain repeater amplifiers 224 with reverse polarization can be strategically placed throughout the system 200 to redirect and strengthen signals to those areas 238 with less than normal minimum signal levels.

Accordingly, there is not only polarization between adjacent transmitters 60, but also between the transmitters and subsequent repeaters 224 within the same individual cell 214.

Modulation diversity provides a level of decoupling between omni transmitted signals and the signals received at the omni site. Thus, for example, frequency modulation might be used for transmission from the omni site 60 while amplitude modulation or digital transmission can be used for signals returning to the master node 60 of the system 200.

Frequency diversity can be used both to separate different signals being simultaneously broadcast from the omni-directional site 60 as well as to separate signals returning from individual users 10, 224 and 230 as, for example, telephone channels, back to the master node 60.

Space diversity provides an added measure of isolation between the omni-directional radiating antenna 62 and the receiving antenna 66 located at the omni-directional site 60. As shown in FIG. 4A this can be accomplished by locating the high power transmitting antenna 62 physically in front of the low power receiving antenna 66 at the master node 60. The fact that the receiver antenna 12 has approximately 2 degrees of reception width further spacially isolates individual subscribers 10, 224 and 230 from neighboring antenna systems. Moreover, the narrow band of the receiving antenna 12 further enhances the separation effectiveness of the transmitter node antennas 62 and 66. In other words the dual ring design allows for maximum isolation. The intrinsic isolation of the transmitting antenna 62, in addition to the polarization diversity also employed, helps to prevent high power transmitter signals and noise from being received in the return channel of the receiver antenna 66 at the transmitter site 60. Additional interference reduction capabilities is provided by the input level control at each receiver.

The entire system 200 employs a self-synchronizing frequency reference, thereby obviating the need for an expensive crystal controlled master oscillator at either the omni-directional 60 or receiver sites 10, 224 and 230. The self-synchronizing method employs the use of a low frequency tone modulation at the omni-directional high power transmitter site 60 designated as $L_1$ in the input 72 of FM multiplexer 70. All receiver sites 10, 224 and 230 include a local oscillator 26 which is tuned through the use of the reference tone $L_1$ to remain in synchronism with the master oscillator of the omni-directional transmitter system 60 as part of a phase lock loop system. Accordingly, all transmit and receive frequencies are synchronized within a covered cell 214. The random frequency variation of the master oscillator frequency 61 in each cell 214 coupled with the high directivity of the receiver antenna 12 provides the final degree of high isolation required for satisfactory system performance.

Lastly, the use of differential phase shift filters 75, 91 and 107 is employed throughout the system 200 to provide very high frequency isolation at low cost. This technique allows for the precise signal filtering necessary to take fullest advantage of the multi-channel capabilities of the communication system 200. These filters could have rejection capabilities as deep as 60 dB (typically 40 dB). Whereas normal band rejection filter would yield only 15 dB (Q=100).

While the invention has been described with reference to the preferred embodiment thereof, it will be appreciated by those of ordinary skill in the art that various modifications can be made to the structure and function of the individual parts of the system without departing from the spirit and scope of the invention as a whole.

I claim:

1. A low power, multi-function cellular television system including a plurality of low power cell node transmitter and a plurality of receivers comprising:
a plurality of substantially omni-directional transmitting antennas connected to cell node transmitter stations; and,
a plurality of directional receiving antennas connected to subscriber receiver stations and directed to receive a television signal from only one of said omni-directional transmitting antennas.

2. The system of claim 1 wherein said receiving antennas have a signal pick-up angle of approximately 2 degrees.

3. The system of claim 2 wherein said transmitting antennas include:
a first group of transmitting antennas for transmitting a signal with a first given transmitted polarity; and,
a second group of transmitting antennas for transmitting a signal with a second given transmitted polarity different from the polarity of the signals of said first group of transmitting antennas.

4. The system of claim 3 wherein said receiving antennas include:
a first group of receiving antennas for receiving signals of said first transmitted polarity; and,
a second group of receiving antennas for receiving signals of said second transmitted polarity.

5. The system of claim 4 further comprising:
subscriber transmitter means for transmitting a signal from a subscriber receiving station to a cell node transmitter station, and,
cell node transmitter station receiving means for receiving said signals from said subscriber transmitter means,
wherein said signals transmitted by said cell node transmitter stations are different in frequency from the signals received by said cell node transmitter stations.

6. The apparatus of claim 5 wherein at least some of said transmitted frequencies from said cell node transmitter stations are different from each other.

7. The system of claim 6 wherein at least some of said receiving frequencies from said subscriber receiving stations are different from each other.

8. The system of claim 7 wherein the modulation mode of at least some of said transmitted signals from said cell node transmitter stations are different from the modulation mode of at least some of said received signals of said subscriber receiving stations.

9. The system of claim 2 wherein said transmitting antennas of said cell node transmitter stations are located in an array such that the polarity of the transmitted signals of adjacent transmitting antennas of said cell node transmitter stations are different.

10. The system of claim 9 further comprising:
repeater means for receiving signals from said omni-directional transmitting antennas and retransmitting said signals to the directional receiving antennas of individual subscriber receiving station.

11. The system of claim 10 wherein the signals transmitted by said repeater means are of a different polarity from the signals received by said repeater means.

12. The system of claim 9 wherein said cell node transmitters include a transmitting antenna for transmitting a signal with a first given polarity and a receiving antenna for receiving signals of a second given polarity different from said first given polarity.

13. The system of claim 12 wherein said subscriber receiver stations include a receiving antenna polarized to receive the signal from said first antenna of said cell node transmitter, said subscriber receiver station also including a transmitter antenna polarized to transmit signals back to the receiving antenna of said cell node transmitter station.

14. The system of claim 13 wherein the transmitting and receiving antennas of the cell node transmitters are physically separated so that one is in front of the other.

15. The system of claim 13 wherein said central node transmitter stations include:
a master oscillator;
wherein said subscriber receiver stations include a phase lock loop for locking onto the frequency of said master oscillator in said cell node transmitters stations,
wherein the phase look loops in said subscriber receiver stations synchronize the receiver with the frequencies of said cell node transmitter stations.

16. The system of claim 15 wherein said subscriber receiver stations include:
differential phase shift filter means for filtering out unwanted frequencies.

17. The system of claim 16 wherein said cell node transmitter stations include:
FM multiplexer for multiplexing a plurality of signals;
a first converter for converting the output from said FM multiplexer;
a first differential phase shift filter for filtering the output from said first converter;
power amplifier means having a first and second input for producing an amplified output;
digital multiplexer means for digitally multiplexing a second plurality of signals;
second converter connected to said digital multiplexer for converting the output frequency from said digital multiplexer;
local oscillator means for providing a second input to said first converter;
phase shifting means connected to said local oscillator means and to said second converter for providing a second frequency input to said second converter;
second differential phase shift filter connected to the output of said second converter, the output of said second differential phase shift filter providing the second input to said power amplifier means;
first antenna coupling means attached to the output of said power amplifier means, said coupling means having an output attached to the transmitting antenna of said cell node transmitter station.

18. The system of claim 17 wherein said cell node transmitter stations further include;
a second antenna coupling means connected to the receiving antenna of said cell node transmitter station;
third differential phase shift filter connected to the output of said second antenna coupling means;
first frequency converter connected to the output of said third differential phase shift filter;
demultiplexer means connected to the output of said first frequency converter;

second frequency converter having an input connected to the output of said first frequency converter;

feedback means forming a second input to said second frequency converter;

discriminator means connected to the output of said second frequency converter, the output of said discriminator means being coupled to the output of said cellular node transmitter station; and, third converter having an input connected to said local oscillator means and an output connected to said first frequency converter.

19. The system of claim 18 wherein said subscriber receiver stations include:

a first frequency converter connected to the receiving element of said antenna of said subscriber receiver station;

coupler means connected to the output of said first frequency converter;

first oscillator means having a frequency control connection connected to said coupler means, the output of said first oscillator means connected as a second input to said first frequency converter;

second frequency converter having an input connected to the output of said coupler means;

discriminator means connected to the output of said second frequency converter;

second oscillator means having a control input terminal thereof connected to the output of said discriminator means, said second oscillator means further having an output terminal thereof connected as a second input to said second frequency converter; and, manually tunable means connected to said second oscillator means for tuning said second oscillator means, wherein the output from said discriminator means forms the input to a conventional television set.

20. The system of claim 19 further comprising:

an offset mixer connected to the output of said first oscillator means;

third oscillator means connected as a second input to said offset mixer;

a second mixer connected to the output of said offset mixer, said second mixer having a second input connected to a source of audio digital data, wherein the output from said second mixer is connected to the transmitting antenna of said subscriber receiver station for transmitting signals back to said cell node transmitter stations with a polarity different from the signals received from said cell node transmitter stations.

* * * * *